(12) United States Patent
Taig et al.

(10) Patent No.: US 10,963,469 B2
(45) Date of Patent: Mar. 30, 2021

(54) AUTOMATIC IDENTIFICATION, DEFINITION AND MANAGEMENT OF DATA FOR DNA STORAGE SYSTEMS

(71) Applicant: EMC IP Holding Company LLC, Hopkinton, MA (US)

(72) Inventors: Ran Taig, Beer Sheva (IL); Avitan Gefen, Tel Aviv (IL); Omer Sagi, Mazkeret Batya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 281 days.

(21) Appl. No.: 15/876,188

(22) Filed: Jan. 21, 2018

(65) Prior Publication Data

US 2019/0228081 A1 Jul. 25, 2019

(51) Int. Cl.

| G06F 16/30 | (2019.01) |
|---|---|
| G06F 16/2457 | (2019.01) |
| G06F 16/22 | (2019.01) |
| G06F 16/901 | (2019.01) |
| H04L 29/08 | (2006.01) |

(52) U.S. Cl.
CPC .... *G06F 16/24578* (2019.01); *G06F 16/2291* (2019.01); *G06F 16/9024* (2019.01); *H04L 67/1097* (2013.01)

(58) Field of Classification Search
None
See application file for complete search history.

(56) References Cited

U.S. PATENT DOCUMENTS

| 2007/0067846 | A1* | 3/2007 | McFarlane | G06F 21/577 726/25 |
| 2013/0290226 | A1* | 10/2013 | Dokken | G06N 5/02 706/12 |
| 2018/0240032 | A1* | 8/2018 | van Rooyen | G06N 7/005 |

* cited by examiner

*Primary Examiner* — Irete F Ehichioya
*Assistant Examiner* — Johnese T Johnson
(74) *Attorney, Agent, or Firm* — Staniford Tomita LLP

(57) ABSTRACT

Embodiments include facilitating DNA storage of digital data including a plurality of data assets in a network by building a causal graph of the network and the relationship of the data assets; computing a value of each data asset; computing, using the causal graph and data values, a radius of recovery for each data asset; classifying each data asset as appropriate DNA stored by assigning a numerical ranking of each data asset; defining manual constraints and a DNA storage configuration; and generating a ranked list of recommended data assets for storing in the DNA storage using the classification, manual constraints and DNA storage configuration.

20 Claims, 6 Drawing Sheets

AUTOMATIC IDENTIFICATION, DEFINITION AND MANAGEMENT OF DATA FOR DNA STORAGE SYSTEMS

TECHNICAL FIELD

Embodiments are generally directed to data storage networks, and more specifically to defining and managing data for storage in DNA storage systems.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The data era is characterized by an overwhelming amount of data that is being generated and stored. The amount of data collected, managed and analyzed in a modern data center can grow at an exponential rate, making the need for data management and monitoring tools indispensable. A key tool for an information technology (IT) administrator is a data valuation advisory, which is a tool that can automatically advise IT management on the importance of a specific data asset so that an optimal decision can be made on the data protection policy that best suits this asset. For example, in a data backup environment, such an advisory can define which data sets should be backed up along with relevant parameters such as optimum backup target, frequency of backup, replication type (synchronous/asynchronous), and so on.

Data storage resources remain among the most the critical areas of investment for enterprises and large-scale network administrators. One of the growing innovative fields of storage research is storing data over DNA sequences, which originally started as a theoretical academic research field, but has been slowly developing into an area of viable industrialization. Many technical methods for DNA storage are practical and well defined, and new developments like random access are adding to the capabilities of DNA storage, thus approaching the point where it will be an essential offering by storage companies. Recent studies indicate that DNA storage will remain limited, at least in the near future, to storing a very limited volume of data that has some very clear properties to make it economically viable. For example, the data must be very valuable, as DNA storage is expected to stay expensive (for encoding and decoding) until new fully automated and cheaper procedures are developed. Likewise, it is practical only for very low access data, as retrieving data from DNA storage is not a trivial process. Some additional considerations are the quality of data so that it can be retrieved with confidence, and the volume of data that can be recovered based on the data stored on DNA, e.g., the data is a "source" which may allow the recovery of other important assets. There are presently no data protection tools that leverage DNA storage. Furthermore, there is no formal definition or uniform formulation of data that is most suited to storage in DNA storage.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
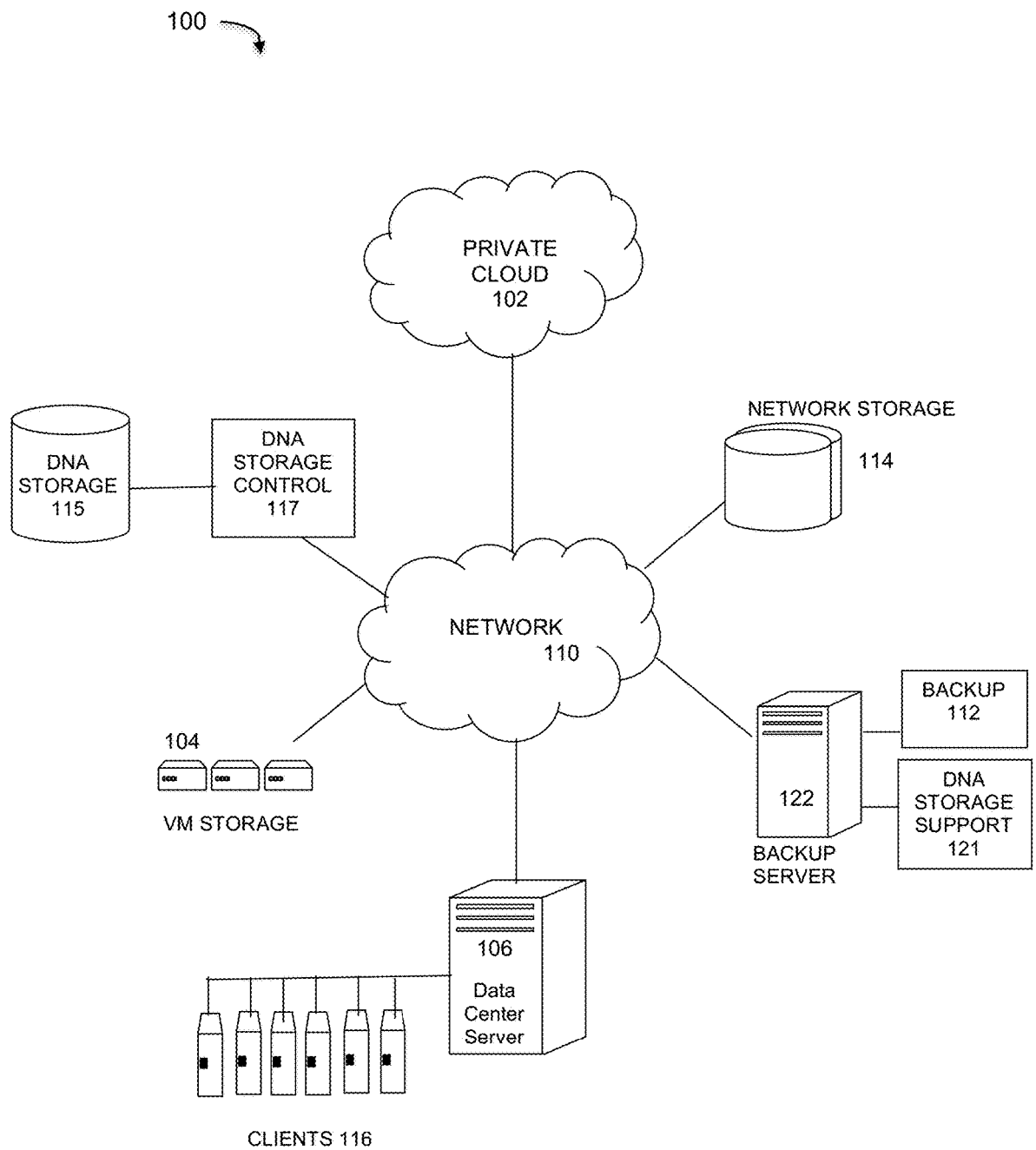
FIG. 1 illustrates an enterprise-scale network system with devices that implement one or more embodiments of a data protection system for DNA storage and support, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard-coded in hardware or take the form of software executing on a general-purpose computer or be hardwired or hard-coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Some embodiments of the invention involve large-scale IT networks or distributed systems (also referred to as "environments"), such as a cloud based network system or very large-scale wide area network (WAN), or metropolitan area network (MAN). However, those skilled in the art will appreciate that embodiments are not so limited, and may include smaller-scale networks, such as LANs (local area networks). Thus, aspects of the one or more embodiments described herein may be implemented on one or more computers in any appropriate scale of network environment, and executing software instructions, and the computers may be networked in a client-server arrangement or similar distributed computer network.

Embodiments provide a well-defined new class of data assets based on the special character of innovative storage devices, such as DNA storage. Embodiments of a DNA storage support process and/or component formally define what the properties of DNA storage data are and how it can be integrated with known applications that prioritize data assets and determine storage policies. For purposes of description, this type of data is referred to as "apocalypse day data" (ADD), referring to the extreme reliability of DNA sequence as compared to data stored on existing magnetic or optical storage drives. Embodiments add a configuration option for existing storage management tools that will define specific data, such as ADD, that is most suitable for storage in DNA storage systems. In addition, an advisory tool is provided that automatically identifies data assets that potentially correspond to the ADD criteria. The tool will prioritize nominated assets, optimizing the cost vs. data value trade-off with respect to the defined cost and volume planned for a next batch of data that will be sequenced into DNA.

Although embodiments are described and illustrated primarily in conjunction with DNA storage systems, it should be noted that these embodiments can be leveraged or applied outside the DNA storage context, such as for any data that is important enough to be put into the most expensive type of data storage, and/or that is to be kept safe and secure in an offline location and retrieved only in an event of a catastrophe.

DNA Data Storage

Digital storage using DNA not a new idea. However, only in the last decade, following the advancement in artificial DNA creation technologies using chemical synthesis, have researchers developed methods to encode/decode digital data to and from base DNA sequences. With time, methods have become more flexible allowing use of this kind of storage for any arbitrary type of data, rather than a specific type as first required. Recent years have brought additional progress, proving the feasibility of random access to a specific section of the data, thus eliminating the need to retrieve all the data stored on a specific sequence, as well as facilitating basic error handling methods.

In general, DNA digital storage stores data in the base sequence of DNA. The technology uses artificial DNA made using commercially available oligonucleotide sequencing machines for storage and DNA sequencing machines for retrieval. The basic process of a DNA storage pipeline s as follows:

Encoding→Synthesis→Storage→Retrieval→Sequencing→Decoding

Present methods and systems for implementing and storing data in DNA storage media may be used with embodiments described herein, as known by those of ordinary skill in the art.

With respect to advantages, DNA storage provides a high degree of data density of compactness. Most recent research suggest a theoretical bound of storage up to 215 petabytes in only one gram (1 gm) of DNA. Practically, today's technology allows reaching up to 85% utilization of this bound, which is up to 1000 times more compact compared to present magnetic media. It also features a significant longevity and survival rate. Most advanced research suggests that a DNA sequence may survive 2000 years if stored at 10 degrees Celsius and up to 1 million years if stored at −18 degrees Celsius. It also features superior energy savings. Research suggests up to $10^8$ less energy spent in the process of DNA storage compared to magnetic storage. Against these benefits are certain disadvantages. First is cost, where the estimated cost of the method is currently around $7,000 per 2 MB encoding and $2,000 for decoding the same 2 MB. Another is a lack of basic memory related technologies (e.g., compression, advanced error handling, deduplication, etc.), which are all essential for industrial storage standards. Third is the slow and semi-manual retrieval process that requires applying DNA sequencing processes.

Thus, DNA storage is generally much more compact than current tape and disk drive storage system s and provides tremendous capacity and great longevity. These features have led researchers to call this method of data storage "apocalypse-proof." As stated above, however, a significant disadvantage of DNA storage is that data retrieval can be a very slow process, as the DNA needs to be sequenced in order to retrieve the data. Thus, the method best used for data with a very low access rate. Furthermore, because it is so costly, it is best reserved for only the most valuable data. With respect to specific benefits and disadvantages of DNA storage, data that is eligible or most appropriate to be stored in DNA storage thus has certain key characteristics. These characteristics (among others) can be listed as follows: (1) limited volume per the data protection policy configurations (e.g., the data must conform with strict batch sizes defined by set policies); (2) low to no access rate (e.g., data that is used once at a pre-defined future date or data that will be used only in the case of catastrophe that has terminated all other backups/replications of the data; (3) extremely high valued data based on existing data valuation algorithms and most suitable to the databases; and (4) high radius of recovery (ROR), where the radius of recovery reflects how many additional existing assets can be fully or partially retrieved from this data. For purposes of discussion, data that fits these characteristics is referred to herein as Apocalypse Day Data (ADD).

FIG. 1 illustrates an enterprise data protection system that implements DNA data storage and support processes under some embodiments. For the example network environment 100 of FIG. 1, a backup server 122 executes a backup management process 112 that coordinates or manages the backup of data from one or more data sources, such as other servers/clients to storage devices, such as network storage 114 and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, which may have attached local storage or utilize networked accessed storage devices 114.

The network server computers are coupled directly or indirectly to the target VMs, and to the data sources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client or server storage. The storage devices represent protection storage devices that serve to protect the system data through the backup process. Thus, backup process 112 causes or facilitates the backup of this data to the storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source (e.g., DB server 106) may be any appropriate data, such as database data that is part of a database management system within a data center comprising a server 106 and clients 116, and the data may reside on one or more hard drives (e.g., 114) for the database(s) in a variety of formats.

As stated above, the data generated or sourced by system 100 and transmitted over network 110 may be stored in any number of persistent storage locations and devices, such as local client storage, server storage, or other network storage. In a particular example embodiment, system 100 may represent a Data Domain Restorer (DDR)-based deduplication storage system, and backup server 122 may be implemented as a DDR Deduplication Storage server provided by Dell-EMC Corporation. However, other similar backup and storage systems are also possible.

Although embodiments are described and illustrated with respect to certain example implementations, platforms, and applications, it should be noted that embodiments are not so limited, and any appropriate network supporting or executing any application may utilize aspects of the DNA storage process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

FIG. 1 generally represents an example of a large-scale IT operation environment that contains a large number of assets required by the business for daily operations. It also represents a data storage system having components that work to facilitate storage of appropriate data in DNA storage devices 115. With respect to DNA storage, backup and recovery to and from DNA storage media 115 may be performed by a DNA storage controller 117. The control component 117 executes the storage of appropriate data onto DNA media of storage devices 115 using known processes of a DNA storage pipeline as described above. Such a pipeline may include artificial DNA media made using commercially available oligonucleotide synthesis machines for storage and DNA sequencing machines for retrieval, or other similar machines, such as nucleic acid memory (NAM) and others, as known to those of skill in the art.

In an embodiment, the appropriate data for storage in DNA media 115 through the DNA storage process 117 is determined by a DNA storage support component 121. In an embodiment component 121 adds the ability to configure a data asset as suitable for DNA storage. For this function, it has a data classifier component that defines a data asset as ADD or non-ADD so that only ADD data is stored on DNA storage 115. It efficiently computes the cost of DNA storage of the asset chosen, so personnel or administrators can make storage decisions in accordance with the data protection budget in hand.

Although illustrated as a process associated with the backup server 122, DNA storage support 121 may be implemented by a separate server in system 100 or in or with DNA storage control process 117. Thus, embodiments of the DNA storage support process 121 may be provided as a process within a backup server process executed by any server or mid-range storage device. It can also be integrated into data protection monitoring software tools as Enterprise Copy Data Analytics (eCDA) program, which is a cloud analytics platform that provides a global view into the effectiveness of data protection operations and infrastructure. This platform provides a global map view displaying current protection status for each site in a simple-to-understand and compare score. Enterprise CDA leverages historical data to identify anomalies and generate actionable insights to more efficiently optimize a protection infrastructure. Other decision support systems are also possible.

Figure 2:
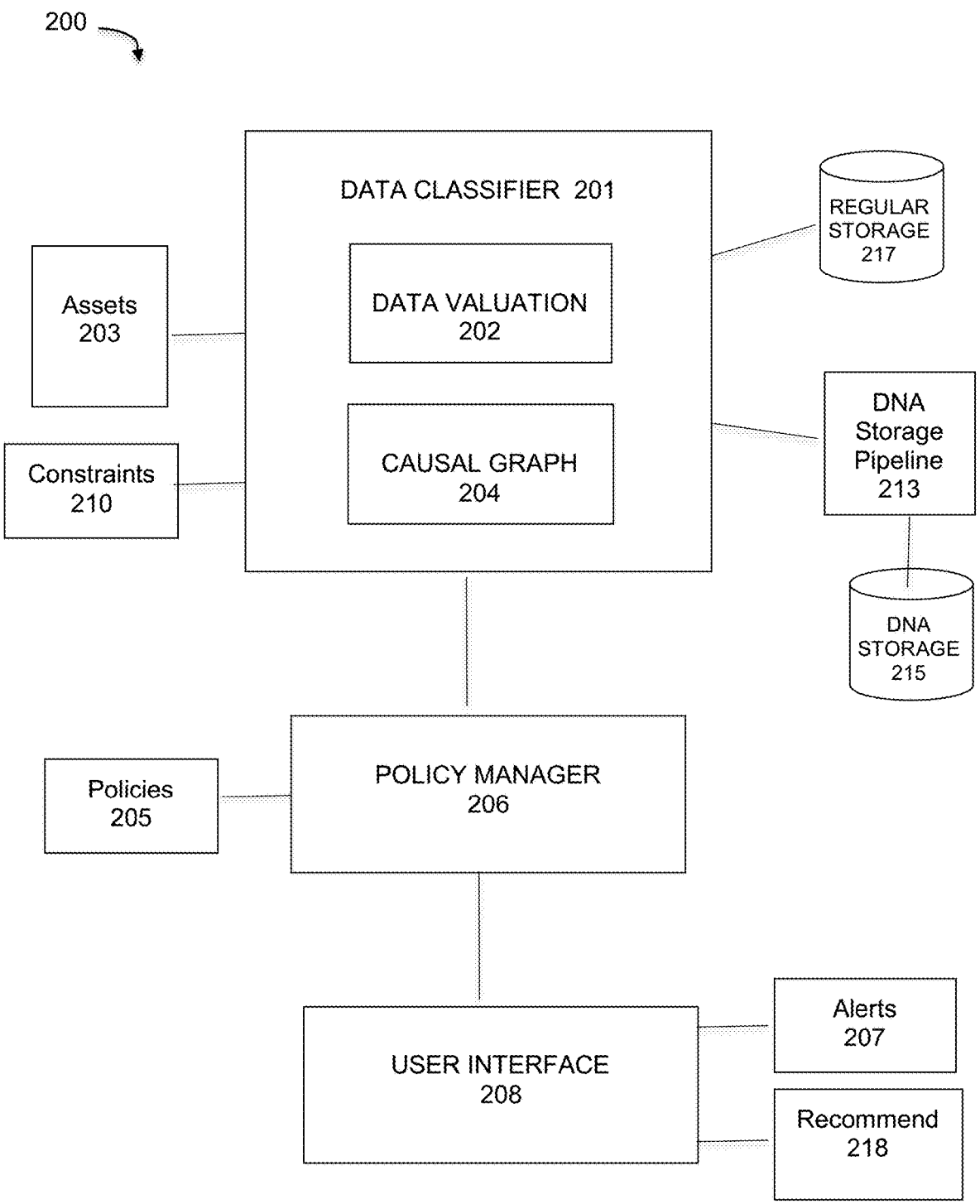
FIG. 2 illustrates the functional components of a DNA storage support component, under some embodiments.

FIG. 2 illustrates the functional components of a DNA storage support component, under some embodiments. System 200 of FIG. 2 illustrates at least part of the DNA storage support component 121 in system 100 of FIG. 1. This component includes a full pipeline to handle ADD data and DNA storage support into existing storage systems, as well as data management tools installed on the storage systems or in the data center they belong to. As mentioned above, data protection policies are essential in modern data center management to allow an appropriate level of protection for each data asset given existing protection means, costs, recovery needs, and so on. In the context of DNA storage systems, such policies and their implementation are vitally important given the very high cost the unique constraints of DNA storage.

The DNA support component of 200 embodies an automated tool that has the ability to understand the data environment and uses a formal definition of ADD, as well as existing data valuation algorithms, to provide a strong and scientific-based recommendation for assets that should be defined as ADD. Additionally, if the system finds that a data configured as ADD does not correspond to the definition, it can alert the administrator with explanations for the reason the asset is believed to be unsuitable for DNA storage. As shown in FIG. 2, component 200 comprises the main functional components of a data classifier 201 that analyzes the characteristics of data assets 203 against definitions and parameters, and a policy manager 206 that applies policies 205 to define and distinguish ADD data from non-ADD data to determine which data is suitable for storage through DNA storage pipeline 213 for storage on DNA 215, and which data should be stored in regular (magnetic or optical) storage 217.

In an embodiment, the data classifier of FIG. 2 includes a data valuation process 202 that implements a valuation algorithm to compute a value v(a) for each asset a of all the relevant data assets 203. The data assets generally include all relevant data and entities of the data environment, such as system 100. A causal graph builder builds a causal graph representing the overall network environment 100 and the relationships among the different assets 203. The output of these tools will allow the process 200 to compute the value of each asset 203 in a computationally efficient process. The list of classified assets comprise recommendation that are matched against a set of constraints 210 defined or configured by the system or an administrator. Such constraints may include any relevant parameters, such as periods of DNA storage execution, space remaining on a storage bin (such as the temporary storage bin described below), data types suited to be stored on DNA, the cost of storing the recommended asset on DNA, and other similar constraints.

In an embodiment, the data support component 200 operates on data that is processed for storage in sequential batches that store data in storage units referred to as "bins." In an embodiment, the data classifier 201 outputs only recommendations that stand in all requirements in the form of answering a constraint such as: "what is the most optimal content for the capacity of the next bin sent to DNA storage." The system will dynamically manage the bin content recommendation up to the date of the next data storage batch.

In an embodiment, the data classifier also receives policies 205 through a policy manager 206. This allows the administrator to add additional or manual constraints or other relevant rules that cannot be captured automatically. For example, such a policy may dictate that an asset was decided not to be exposed to DNA storage due to security. Another example policy may be the converse of this policy. For example, a policy that an asset was decided to be exposed to DNA storage due to a specific business oriented reason that cannot be captured from the database itself, such as financial reports that are isolated from any other data resource. These policies are provided for example only, and other policies are also possible.

Each new asset manually configured to be an ADD can be matched against the ADD conditions and the policies 205/constraints 210. In case it violates any of them the system produces a suitable alert 207 through user interface 208. Given the data valuation and these other conditions, the system 200 will output a rank of recommended assets 218 to be stored in the DNA form. A user can then specify which ADD assets should be processed through the DNA storage pipeline. Alternatively, the system can be configured to send all or a percentage (e.g., top 50%) of ADD classified or recommended data to the DNA storage pipeline 213.

In an embodiment, and due to the special nature of the DNA storage pipeline, the DNA storage support component 200 can also be configured to add a dedicated storage region on the DNA storage device 215 with maximum conservative protection (e.g. non-DNA) to act as a storage bridge and increase the efficiency of ADD and non-ADD storage. This can be used as a bin to ADD on periods until the next batch of DNA storage will executed. This will bridge the fact that DNA storage, at least on the first stage, requires special, costly and periodic process, rather than an immediate execution of backup or replication. The bin is then fed to the DNA storage pipeline 213 on a pre-configured period (weekly, monthly, and so on).

Classifying ADD Data

As shown in FIG. 2, the data classifier 201 defines the type of data (ADD data) that is most appropriate to be stored on DNA or any other highly secured storage method. The overall support component 200 includes mechanisms that extend customers' IT policies by providing the capability of defining apocalypse-day-data and ensuring its security and availability and by leveraging the benefits of DNA storage. The data classifier 201 defines ADD as a formal concept for use in DNA storage systems, as well as existing storage tools and devices. A data asset can be classified as ADD or non-ADD depending on various characteristics or parameters that make the asset more suitable for DNA storage as compared to other assets. Such characteristics can be listed in tabular form for automatic or manual comparison by an automated agent or user. Table 1 below lists an example of characteristics that are used to define ADD data versus non-ADD data.

TABLE 1

| RANK | CHARACTERISTIC |
|---|---|
| 1 | ACCESS RATE (Low access priority) |
| 2 | DATA VALUE (High value priority) |
| 3 | VOLUME (Limited volume per protection policy configuration) |
| 4 | RADIUS OF RECOVERY (ROR) (High ROR priority) |
| 5 | DATA RAWNESS (Raw data priority, e.g.: R(a) = 0) |

Each characteristic of Table 1 has a parameter that may be specified within a predetermined range, such as data value can be high/medium/low or ranked on a scale of 1-10 and so on. Furthermore, the five characteristics may be ranked relative to each other to give greater weight to the characteristics relative to each other. Such a table can be used to generate a weighted formulation of scaled or rated parameters that can be used to comprehensively classify particular data assets in a definition of ADD and non-ADD data. Table 1 is provided for purposes of example only, and a list of characteristics, their constituent parameters, and their relative ranking may be different and may include other or different characteristics.

In an embodiment, each possible ADD asset is recommended to be stored or not stored in DNA data based on its relative ranking. That is, the different assets may be ranked by score, where the score is based on the value of the characteristics in Table 1. Each characteristic is given a grade that is assigned for each asset. The characteristic grades are then combined in a defined combinatorial relationship for each asset to derive their respective score. The characteristic grades can be assigned on pre-defined scales, such as 1 to 5 or 1 to 10, and these grades may be weighted by the rank of the characteristic. For example, as asset that is intended to be accessed once a year may be assigned a grade of 5 (out of 10) for the first rank of Table 1, while an asset that is never accessed unless there is catastrophic failure may be assigned a grade of 10 on the same scale. For the other scales in Table 1 (e.g., ROR, data value, volume size) the grades are pre-defined. In other embodiments, the grades may be user-assigned, system assigned, or automatically generated based on system configuration and constraints, and the types of data assets being classified.

For the embodiment shown in Table 1, the classifier uses the radius of recovery (ROR) of each asset, which is a metric that reflects how many additional existing assets can be fully or partially retrieved from the ADD data relative to other ADD data. An example formulation for the ROR calculation proceeds as follows:

1. Let $a_i$ be an existing data asset in the database.
2. Assume all data assets are graded, using existing data valuation algorithms and/or manual grading by domain expert, with a numeric value v, such that $V(a_i)=v$.
3. Denote the resources group from which $a_i$ has been created as $R(a_i)=\{r_1, r_2, \ldots, r_k\}$
4. Assume all resources are mutually exclusive, e.g. $\forall r_m, r_n \in R(a_i): r_m \notin R(r_n) \land r_n \notin R(r_m)$. For Raw data $R(a)=0$. This is the minimal set of resources where no resource subsumes another resource within the same resources group.
5. Define the radius of recovery (ROR) of a data asset as follows:

$$ROR(a) = \begin{cases} 0 & \{a_i : a \in R(a_i)\} = \emptyset \\ \sum_{a_i : a \in R(a_i)} \frac{\alpha \cdot v(a_i) + \beta \cdot ROR(a_i)}{|R(a_i)|} & \text{else} \end{cases}$$

The radius of an asset a reflects the number of assets that can be retrieved using a taking into account the value of the created asset as well as its own propagated ROR and with respect to the proportional part of a in creating it.

The coefficients $\alpha$ and $\beta$ are set to a default value, such as $\alpha=\beta=0.5$. This value can be set by the user to reflect the weight to be given to the original value of the asset and the complementary weight to be given to the propagated ROR grade.

In an embodiment, the ROR computation shown above is performed using a causal graph and a data valuation algorithm. The data valuation algorithm computes the value v(a) for each asset a, and the causal graph represents the network environment and the relationships among all of the assets. An explanation and description of causal graphs is provided in further detail below.

Figure 3:
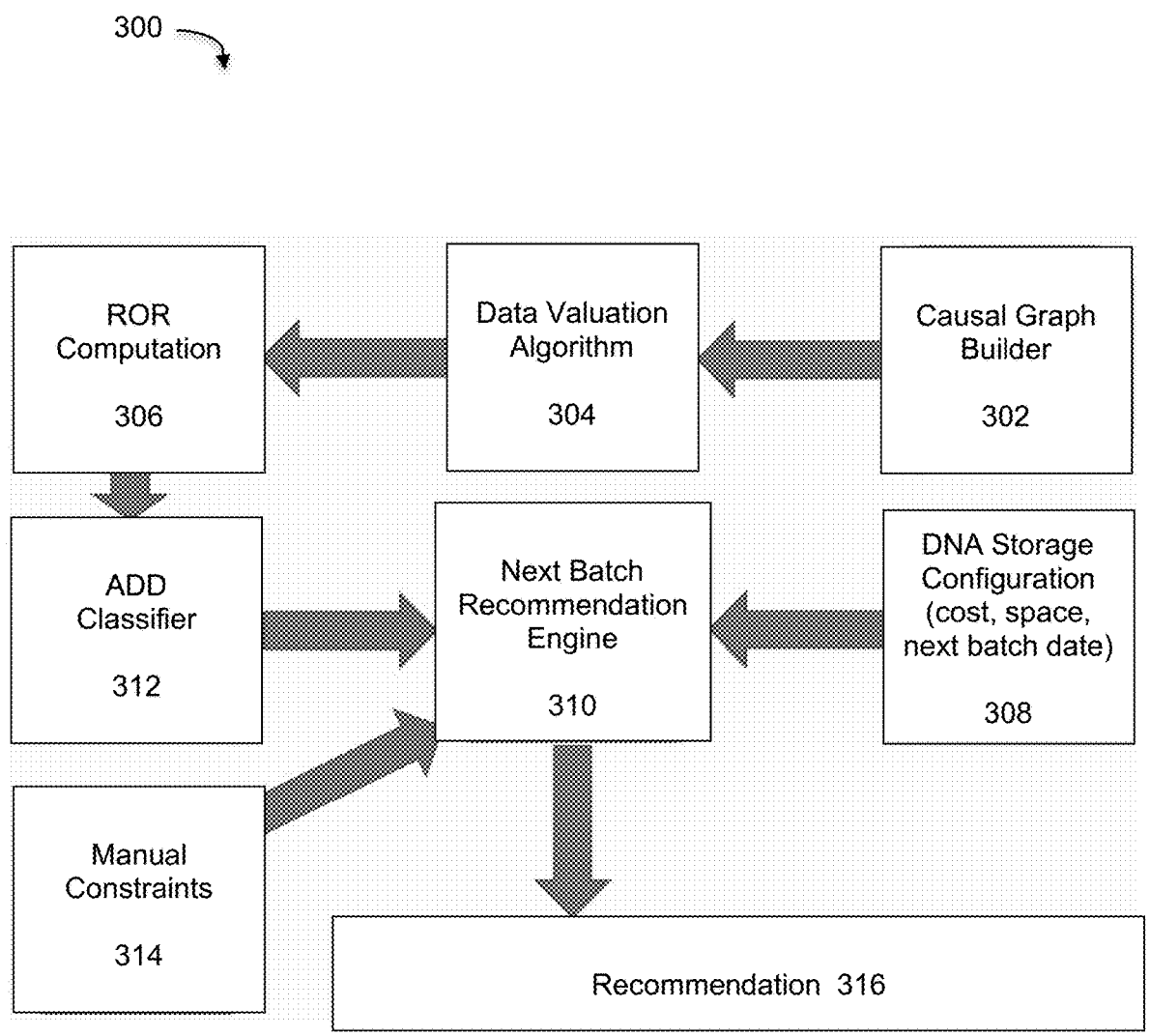
FIG. 3 is a diagram that illustrates a process of deriving a recommendation for DNA storage of ADD data based on the classification and ROR computation, under some embodiments.

FIG. 3 is a diagram that illustrates a process of deriving a recommendation for DNA storage of ADD data based on the classification and ROR computation, under some embodiments. As shown in diagram 300, causal graph builder 302 builds a causal graph of the network and the assets, which is then provided to data valuation algorithm 304. The values $V(a_i)$ are used to compute the ROR for each asset $a_i$ in ROR computation component 306. The network causal graph is a directed acyclic graph so the ROR computation will require simple breadth-first search (BFS) traversal in a time linear in the size of the graph, initializing sink node l with ROR(l)=0. Source nodes represent raw data while sink nodes represent the most complex data in some pipeline. This framework also allows quick computation of ROR for new assets as they are added to the network.

The ROR computation is then provided to the ADD classifier 312. The output of the ADD classifier is a numerical rank of the assets. The classification from classifier 312 is provided along with manual constraints 314 to a next batch recommendation engine 310. This engine also receives configuration information 308 about the DNA storage. This information includes parameters such as cost, space, next batch date, and so on. The next batch recommendation then outputs a recommendation 316 to the user regarding storage of the next data batch.

Causal Graphs

As described above, in an embodiment, system 100 includes a causal graph process. Causal Graphs are graphical models used to encode causal assumptions about data-generating process. They are used in several fields such as computer science, epidemiology and social sciences. Each variable in the model has a corresponding node and an arrow (arc in graphical terminology) is drawn from variable v1 to v2 if v2 is presumed to respond to changes that occur in v1 when all other variables are being held constant. Causal graphs are also DAGs (a graph with no cycles). In a DAG nodes with only outgoing arcs will be called sources while nodes with only ingoing arcs will be called sinks.

Domain experts can use causal graphs to model causal interactions of components in a complex system such as IT environment. The nodes in the graph would represent components of the system that are related to each other through causal relationship (represented by arcs) and have a measurable quality that is being tracked, like size of available storage or the storage capacity. Any DAG has at least one source and one sink node. Source nodes represents processes which are at the top hierarchy of tracked processes in the environment, while sink nodes are at the bottom of the hierarchy. Sink nodes represent behavioral qualities of high interest in complex systems such as storage capacity. These components could be important by their own, but they could also be positioned at the end of a pipeline and therefore represent the health of a complex set of processes. In the context of a causal graph, causality is the relationship between a cause process and an effect process. Practical tools using causality prove that the value of a first variable value directly influences or causes the values of a second variable. The causality may be proven through the use of tests or similar methods. Causality is considered a much stronger relation than correlation as the latter may be the result of coincidence or a third variable that influences both the first and second variables.

Figure 4:
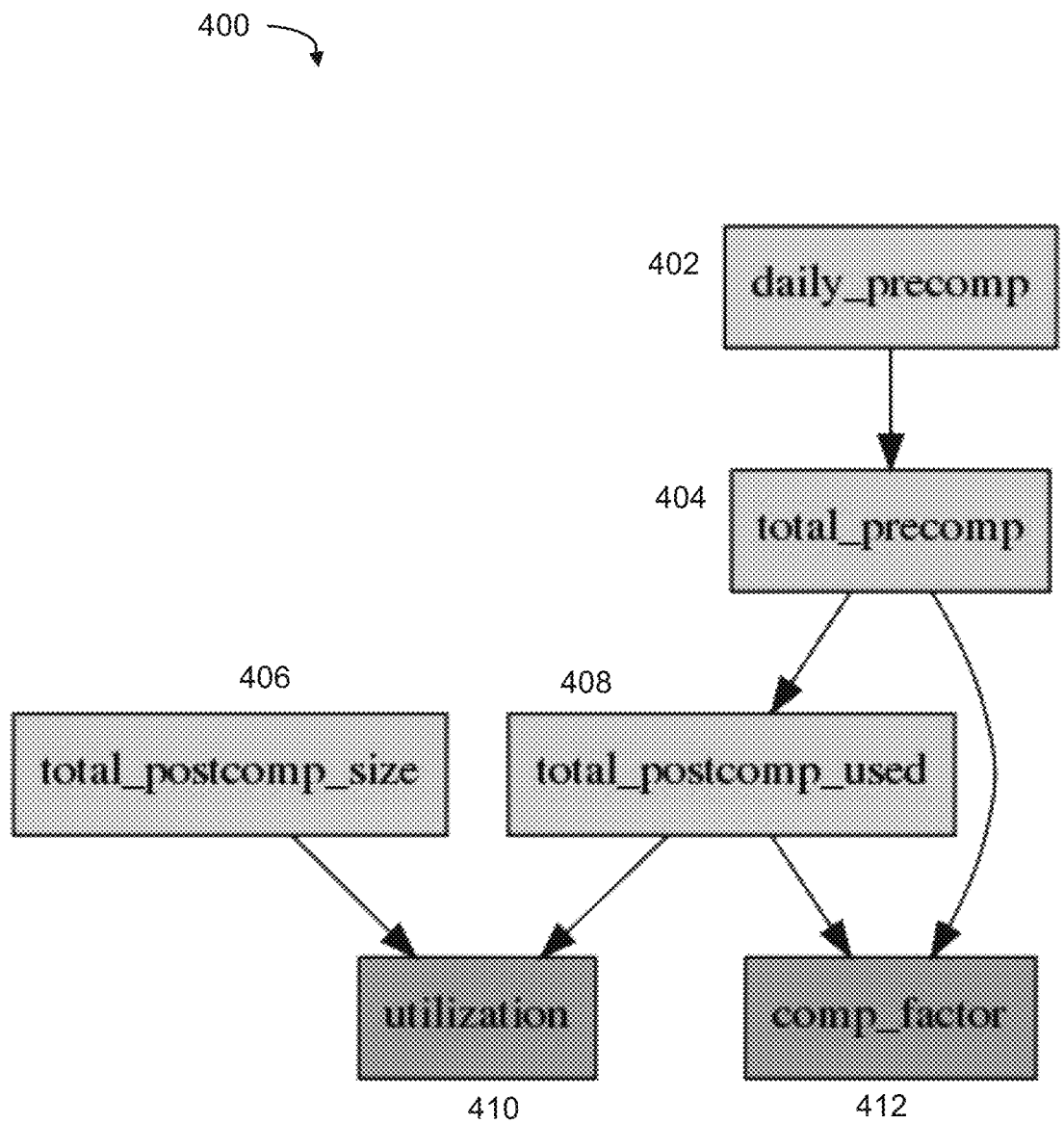
FIG. 4 is an example causal graph that may be used as an example for some embodiments.

FIG. 4 illustrates an example causal graph as may be used as an example in some embodiments. FIG. 4 is intended to provide an example of a causal graph based on a particular application for data storage in a Data Domain system. Many other causal graphs may be generated for networks and data assets such as system 100 as appropriate. As can be seen in FIG. 4, causal graph 400 contains six nodes and six edges. This example graph illustrates example metrics used in a Data Domain (or other backup system) comprising components of the graph. In the example causal graph 400, nodes 402 and 406 are source nodes, and nodes 410 and 412 are sink nodes. The example nodes may be defined as follows: Daily_precomp node 402 is the size of "logical" data that was backed up each day; Total_precomp node 404 is the total size of real "logical" data that is backed up; Total_postcomp_used node 408 is the used capacity, i.e., the total data size after compression; Total_postcomp_size node 406 is the total capacity available; Comp_factor node 412 equals (total_precomp)/(total_postcomp_used); and Utilization node 410 equals (total_postcomp_used)/(total_postcomp_size). As stated above, graph 400 is intended to be for example only, and any appropriate causal graph may be used or generated by causal graph builder 302 under embodiments.

Figure 5:
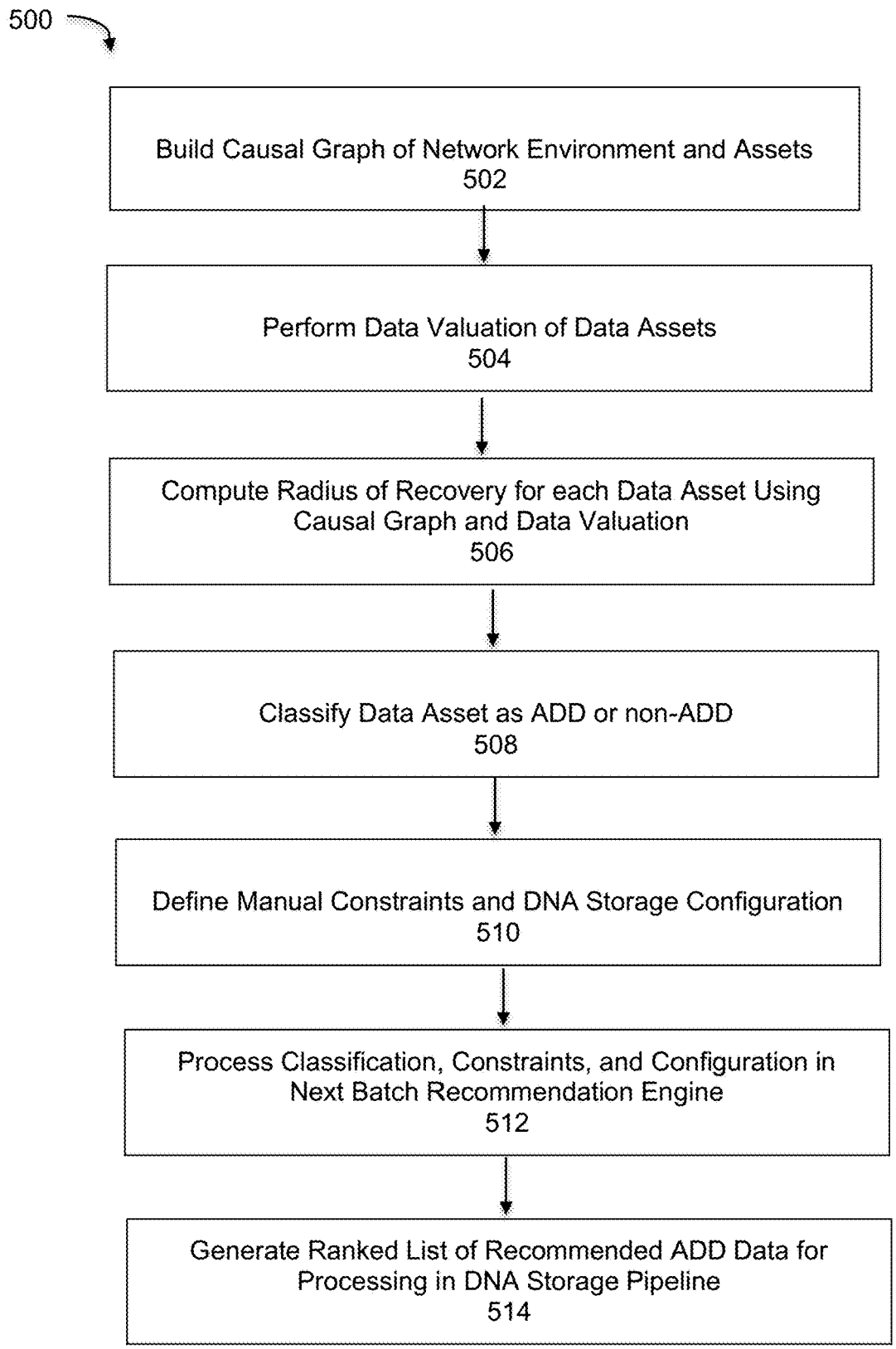
FIG. 5 is a flowchart that illustrates an overall method of classifying ADD data for storage in a DNA storage pipeline, under some embodiments.

FIG. 5 is a flowchart that illustrates an overall method of classifying ADD data for storage in a DNA storage pipeline, under some embodiments. As shown in FIG. 5, process 500 starts by building a causal graph of the network and the relationship of the data assets, 502. The process also computes the value of each data asset, 504. The causal graph and values $V(a_i)$ are used to compute the ROR for each asset, 506. The ROR computation is then used to classify each data asset as ADD or non-ADD data in the form of a numerical rank of the assets, 508. This ranking is possibly modified by manual constraints and DNA storage configuration defined in step 510. A next batch recommendation engine processes the classification, constraint and configuration, 512 to produce a ranked list of recommended ADD data for processing in a DNA storage pipeline, 514.

System Implementation

Figure 6:
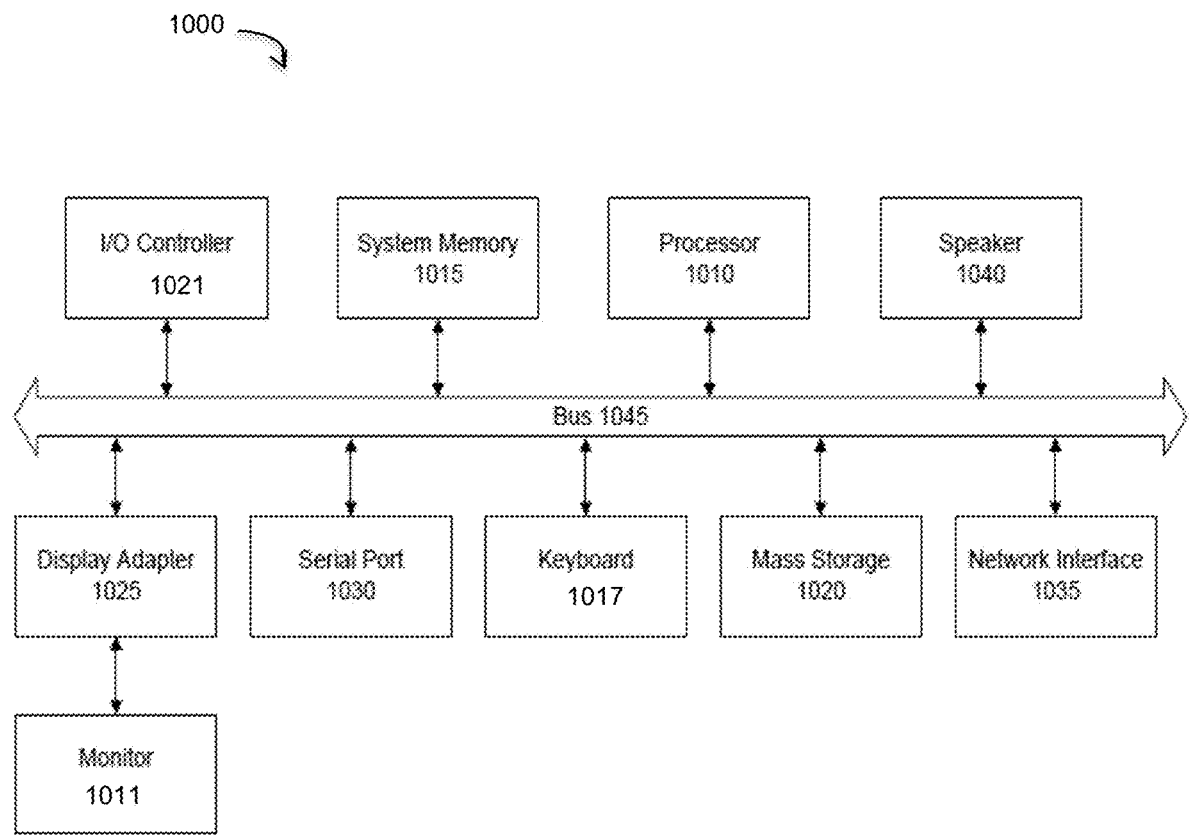
FIG. 6 is a block diagram of a computer system used to execute one or more software components of a DNA storage support process, under some embodiments.

As described above, in an embodiment, system 100 includes a DNA storage support process 121 that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein. FIG. 6 is a block diagram of a computer system used to execute one or more software components of a DNA storage support process, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 6 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

Embodiments may be applied to data, storage, industrial networks, and the like, in any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of facilitating DNA storage of digital data including a plurality of data assets in a network for a data backup and recovery operation, the method comprising:
    providing DNA storage to store the digital data in base sequences of artificial DNA, wherein the DNA storage is characterized by high reliability and slow retrieval times, and wherein the data assets comprise critical but very low access rate data;
    defining characteristics of each data set and relationships among the data assets;
    classifying, in a data classifier, the data assets as Apocalypse Day Data (ADD) suitable for storage in the DNA storage based on the characteristics comprising: access rate, data value, data volume, radius of recovery, and data rawness;
    computing, using the relationships and data values, a radius of recovery (ROR) for each data asset, wherein the ROR is a measure of additional assets that can be retrieved from a respective data asset in the data backup and recovery operation;
    assigning a numerical ranking to each data asset based on the respective characteristics and the ROR;
    defining manual constraints and a DNA storage configuration; and
    generating a ranked list of recommended data assets for storing in the DNA storage using the classification, manual constraints and DNA storage configuration; and
    storing at least some of the recommended data assets in the DNA storage for later retrieval using DNA sequencing and decoding methods.

2. The method of claim 1 wherein the defining relationships step comprises building a causal graph representing the network and the relationships among the data assets.

3. The method of claim 2 wherein causal graph is a directed acyclic graph, and the ROR is computed by a breadth-first search (BFS) traversal in a time linear manner in the size of the graph with a sink node (l) initialized at ROR(l)=0.

4. The method of claim 1 further comprising matching the recommended data assets against a set of defined policy constraints input to the data classifier.

5. The method of claim 4 further comprising;
    displaying the recommended assets to a user for selection of selected data assets as DNA stored data; and
    sending an alert in the event a recommended data asset violates a defined policy constraint.

6. The method of claim 1 wherein with respect to access rate, a low access rate characterizes ADD data; with respect to data value, a high value characterizes ADD data; with respect to data volume, a limited volume per protection policy configuration characterizes ADD data; and with respect to radius of recovery, a high ROR value characterizes ADD data.

7. The method of claim 6 further comprising:
    assigning a numeric grade to each characteristic of a graded data asset;
    combining the assigned numeric grades to derive a score for the graded data asset; and
    using the score to rank the graded data asset in the ranked list relative to other graded data assets.

8. The method of claim 7 wherein the ROR for a data asset indicates how many additional existing data assets can be at least partially retrieved from the data asset, and depends on the data rawness, which comprises a minimal set of resources where no resource subsumes another resource within a same resource group.

9. The method of claim 1 wherein data classified as appropriate for DNA storage is created in batches on a periodic basis.

10. The method of claim 1 further comprising:
    adding a dedicated storage region to a storage device having maximum storage protection for non-DNA eligible storage data;
    storing a present batch of appropriate DNA data to the dedicated storage region until a next batch of appropriate DNA data is processed; and
    transmitting the present batch of appropriate DNA data to a DNA storage pipeline for storage on DNA media after a pre-defined time period.

11. A system of facilitating DNA storage of digital data including a plurality of data assets in a network for a data backup and recovery operation, comprising:
    a DNA storage configured to store the digital data in base sequences of artificial DNA, wherein the DNA storage is characterized by high reliability and slow retrieval times, and wherein the data assets comprise critical but very low access rate data;
    a first component defining characteristics of each data set and relationships among the data assets;
    a data valuation component computing a value of each data asset;
    a computer computing, using the relationships and data values, a radius of recovery (ROR) for each data asset, wherein the ROR is a measure of additional assets that can be retrieved from a respective data asset in the data backup and recovery operation;
    a classifier classifying each data asset as Apocalypse Day Data (ADD) suitable for storage in the DNA storage based on the characteristics comprising: access rate, data value, data volume, and data rawness by assigning a numerical ranking to each data asset based on the respective characteristics and ROR;

a policy module defining manual constraints and a DNA storage configuration;

an output interface generating a ranked list of recommended data assets for storing in the DNA storage using the classification, manual constraints and DNA storage configuration; and the DNA storage storing at least some of the recommended data assets in the DNA storage for later retrieval using DNA sequencing and decoding methods.

12. The system of claim 11 wherein the first component comprises a causal graph builder building a causal graph representing the network and the relationships among the data assets.

13. The system of claim 12 wherein causal graph is a directed acyclical graph, and the ROR is computed by a breadth-first search (BFS) traversal in a time linear manner in the size of the graph with a sink node (l) initialized at ROR(l)=0.

14. The system of claim 13 further comprising an automated component matching the recommended data assets against a set of defined policy constraints provided by the policy module.

15. The system of claim 14 wherein the output interface further displays the recommended assets to a user for selection of selected data assets as DNA stored data, and sends an alert in the event a recommended data asset violates a defined policy constraint.

16. The system of claim 11 wherein with respect to access rate, a low access rate characterizes ADD data; with respect to data value, a high value characterizes ADD data; with respect to data volume, a limited volume per protection policy configuration characterizes ADD data; and with respect to radius of recovery, a high ROR value characterizes ADD data.

17. The system of claim 16 wherein the computer further assigns a numeric grade to each characteristic of a graded data asset, combines the assigned numeric grades to derive a score for the graded data asset, and uses the score to rank the graded data asset in the ranked list relative to other graded data assets.

18. The system of claim 17 wherein the ROR for a data asset indicates how many additional existing data assets can be at least partially retrieved from the data asset, and depends on the data rawness, which comprises a minimal set of resources where no resource subsumes another resource within a same resource group, and further wherein data classified as appropriate for DNA storage is created in batches on a periodic basis.

19. The system of claim 11 further comprising:

dedicated storage region added to a storage device having maximum storage protection for non-DNA eligible storage data;

a storing component storing a present batch of appropriate DNA data to the dedicated storage region until a next batch of appropriate DNA data is processed; and the output interface transmitting the present batch of appropriate DNA data to a DNA storage pipeline for storage on DNA media after a pre-defined time period.

20. A computer program product, comprising a non-transitory computer-readable medium having a computer-readable program code embodied therein, the computer-readable program code adapted to be executed by one or more processors to perform a method facilitating DNA storage of digital data including a plurality of data assets in a network for a data backup and recovery operation, the method comprising:

providing DNA storage to store the digital data in base sequences of artificial DNA, wherein the DNA storage is characterized by high reliability and slow retrieval times, and wherein the data assets comprise critical but very low access rate data;

defining characteristics of each data set and relationships among the data assets;

classifying, in a data classifier, the data assets as Apocalypse Day Data (ADD) suitable for storage in the DNA storage based on the characteristics comprising: access rate, data value, data volume, radius of recovery, and data rawness;

computing, using the relationships and data values, a radius of recovery (ROR) for each data asset, wherein the ROR is a measure of additional assets that can be retrieved from a respective data asset in the data backup and recovery operation;

assigning a numerical ranking to each data asset based on the respective characteristics and the ROR;

defining manual constraints and a DNA storage configuration; and generating a ranked list of recommended data assets for storing in the DNA storage using the classification, manual constraints and DNA storage configuration; and storing at least some of the recommended data assets in the DNA storage for later retrieval using DNA sequencing and decoding methods.

* * * * *